(12) United States Patent
Salvo (10) Patent No.: US 9,947,194 B2
(45) Date of Patent: Apr. 17, 2018

(54) METHODS, DEVICES, KITS AND SYSTEMS FOR MODULATING ACTIVATION OF SELF-ALARMING TAGS

(71) Applicant: Giovanni Salvo, Rosemere (CA)

(72) Inventor: Giovanni Salvo, Rosemere (CA)

(*) Notice: Subject to any disclaimer, the term of this patent is extended or adjusted under 35 U.S.C. 154(b) by 0 days.

(21) Appl. No.: 15/306,407

(22) PCT Filed: Apr. 23, 2015

(86) PCT No.: PCT/CA2015/000267
§ 371 (c)(1),
(2) Date: Oct. 24, 2016

(87) PCT Pub. No.: WO2015/161359
PCT Pub. Date: Oct. 29, 2015

(65) Prior Publication Data
US 2017/0046932 A1  Feb. 16, 2017

Related U.S. Application Data

(60) Provisional application No. 61/983,383, filed on Apr. 23, 2014.

(51) Int. Cl.
| | | |
|---|---|---|
| *G08B 13/14* | (2006.01) |
| *G08B 13/24* | (2006.01) |
| *G06Q 10/00* | (2012.01) |
| *G06K 7/10* | (2006.01) |
| *H04B 5/00* | (2006.01) |
| *G06K 19/06* | (2006.01) |
| *G06K 19/077* | (2006.01) |

(52) U.S. Cl.
CPC ............ *G08B 13/246* (2013.01); *G06K 7/10* (2013.01); *G06K 19/06018* (2013.01); *G06K 19/07749* (2013.01); *G06Q 10/00* (2013.01); *H04B 5/0031* (2013.01); *H04B 5/0062* (2013.01); *G08B 13/24* (2013.01)

(58) Field of Classification Search
CPC combination set(s) only.
See application file for complete search history.

(56) References Cited

U.S. PATENT DOCUMENTS

6,169,483 B1 * 1/2001 Ghaffari ............... G06Q 10/087
340/568.1
9,443,407 B2 * 9/2016 Davidson ........... G06K 7/10356
(Continued)

*Primary Examiner* — Travis Hunnings
(74) *Attorney, Agent, or Firm* — Praxis (57) ABSTRACT

Modulating the activation of an anti-theft self-alarming tag linked to an article is provided by a input/output interface In communication with the self-alarming tag for transmitting a deactivation signal to the self-alarming tag for deactivation thereof upon the request of a user. A processor is in communication the input/output interface for control thereof. The processor is in communication with a database comprising information on whether the article has been purchased or not for receiving purchase information therefrom. The processor Is configured to allow the input/output interface to transmit the deactivation signal to the self-alarming tag if the article linked therewith has been purchased and to prevent the input/output interface from transmitting the deactivation signal to the self-alarming tag if the article linked therewith has not been purchased.

20 Claims, 2 Drawing Sheets

(56) References Cited

U.S. PATENT DOCUMENTS

| | | | |
|---|---|---|---|
| 2005/0190060 A1* | 9/2005 | Clancy | G08B 13/246 340/572.9 |
| 2006/0016885 A1* | 1/2006 | Roberts | G08B 13/2402 235/383 |
| 2007/0188333 A1* | 8/2007 | Clancy | G08B 13/246 340/572.9 |
| 2009/0045955 A1* | 2/2009 | Ulrich | G06Q 20/208 340/572.1 |
| 2010/0198706 A1* | 8/2010 | Kangas | G06Q 10/087 705/28 |
| 2010/0300159 A1* | 12/2010 | Berg | C09J 9/02 70/58 |
| 2014/0125800 A1* | 5/2014 | Van Nest | G08B 13/246 348/143 |
| 2015/0009035 A1* | 1/2015 | Rasband | G08B 13/2454 340/572.3 |
| 2015/0029027 A1* | 1/2015 | Marin Villamayor | G08B 13/2465 340/572.1 |

* cited by examiner

METHODS, DEVICES, KITS AND SYSTEMS FOR MODULATING ACTIVATION OF SELF-ALARMING TAGS

CROSS-REFERENCE TO RELATED APPLICATIONS

The present application claims priority on U.S. patent application Ser. No. 61/983,383 filed on Apr. 23, 2014 and incorporated herein in its entirety.

TECHNICAL FIELD

The present disclosure generally relates to security tags. More particularly, but not exclusively, the present disclosure relates to methods, devices, kits and systems for modulating activation of self-alarming tags.

BACKGROUND

Employee theft is a significant problem in the retail industry. Most security devices target shoplifting customers and are put into the hands of employees for safekeeping. As such, employees have the ability to easily remove or by-pass security tags. Furthermore, most devices are mechanical (magnetic detachers and/or keys) which offer no ability to track and trace employee activity.

OBJECTS

An object of the present disclosure is to provide a system for modulating activation of self-alarming tags.

An object of the present disclosure is to provide a device for modulating activation of self-alarming tags.

An object of the present disclosure is to provide a kit for modulating activation of self-alarming tags.

An object of the present disclosure is to provide a method for modulating activation of self-alarming tags.

SUMMARY

In accordance with an aspect of the disclosure, there is provided a system for modulating the activation of a plurality of anti-theft self-alarming tags linked to respective articles, the system comprising: at least one database comprising information on whether a given one or more of the plurality of articles has been purchased or not; at least one input/output interface in communication with at least one of the plurality of self-alarming tags for transmitting a deactivation signal to the given one given self-alarming tag for deactivation thereof upon the request of a user; at least one processor in communication with the database for receiving purchase information therefrom and with the input/output interface for control thereof, wherein the processor is configured to allow the input/output interface to transmit the deactivation signal to the given self-alarming tag if the article linked therewith has been purchased and to prevent the input/output interface from transmitting the deactivation signal to the given one self-alarming tag if the article linked therewith has not been purchased.

In an embodiment of the system, the at least one processor comprises a set of additional conditions for allowing the input/output device to transmit the deactivation signal to the self-alarming tag, selected from the group consisting of: a predetermined time lapse between the purchase time of the article and the request of a user; a predetermined location of the self-alarming tag and the article; a predetermined location of the input/output interface; a predetermined distance between the input/output interface and the self-alarming tag; an identification code entry of the user prior to the request; and any combination of the foregoing.

In accordance with an aspect of the disclosure, there is provided a system for modulating the activation of a plurality of anti-theft self-alarming tag mounted to respective articles, each self-alarming tag signaling an alarm indicative of an unauthorized distance between each tag and the respective article it is mounted to, the system comprising: at least one database comprising information on whether a given one or more of the plurality of articles has been purchased or not; at least one input/output interface in wireless radiofrequency communication with at least one of the plurality of self-alarming tags for transmitting a deactivation signal to the given one given self-alarming tag for deactivation thereof upon the request of a user; at least one processor in communication with the database for receiving purchase information therefrom and with the input/output interface for control thereof, wherein the processor is configured to allow the input/output interface to transmit the deactivation signal to the given self-alarming tag if the article linked therewith has been purchased and to prevent the input/output interface from transmitting the deactivation signal to the given one self-alarming tag if the article linked therewith has not been purchased, and wherein the at least one processor comprises a set of additional conditions for allowing the input/output device to transmit the deactivation signal to the self-alarming tag, selected from the group consisting of: a predetermined time lapse between the purchase time of the article and the request of a user; a predetermined location of the self-alarming tag and the article; a predetermined location of the input/output interface; a predetermined distance between the input/output interface and the self-alarming tag; an identification code entry of the user prior to the request; and any combination of the foregoing.

In an embodiment, at least one the plurality of the tags is selected from the group consisting of an RFID tag, an RFID-EPC tag, an EAS tag, a smart label, an intelligent bar code and any combination thereof.

In an embodiment, the system further comprises a purchase interface for effectuating purchase of the article.

In an embodiment, the system further comprises a device for modulating the activation of a plurality of anti-theft self-alarming tags linked to respective articles, wherein the device comprises a element selected from the group consisting of the input/output interface, the processor, the database, the purchase interface and any combination thereof. In an embodiment, the device comprises a handheld unit.

In an embodiment, the processor communicates with an alarm-signaling device to signal an alarm if a predetermined irregular amount of deactivation requests have been made.

In an embodiment, the system further comprises additional monitoring devices at predetermined regions within a purchasing area, in an embodiment, the additional monitoring devices are selected from the group consisting of: image capture devices, sensors, cameras, GPS devices, RFID devices and any combination thereof.

In an embodiment, the system further comprises a plurality of processors and a master processor in communication with the plurality of processors for receiving activity information therefrom, the master processor configured to analyze the activity information.

In accordance with an aspect of the disclosure, there is provided a device for modulating the activation of an anti-theft self-alarming tag linked to an article, the device comprising: a database comprising information on whether the article has been purchased or not; an input/output interface In communication with the self-alarming tag for transmitting a deactivation signal to the self-alarming tag for deactivation thereof upon the request of a user; a processor in communication with the database for receiving purchase information therefrom and with the input/output interface for control thereof, wherein the processor is configured to allow the input/output interface to transmit the deactivation signal to the self-alarming tag if the article linked therewith has been purchased and to prevent the input/output interface from transmitting the deactivation signal to the self-alarming tag if the article linked therewith has not been purchased.

In an embodiment of the device, the processor comprises a set of additional conditions for allowing the input/output device to transmit the deactivation signal to the self-alarming tag, selected from the group consisting of: a predetermined time lapse between the purchase time of the article and the request of a user; a predetermined location of the self-alarming tag and the article; a predetermined location of the input/output interface; a predetermined distance between the input/output interface and the self-alarming tag; an identification code entry of the user prior to the request; and any combination of the foregoing.

In accordance with an aspect of the disclosure, there is provided a device for modulating the activation of an anti-theft self-alarming tag mounted to an article, the self-alarming tag signaling an alarm indicative of an unauthorized distance between the tag and the article, the device comprising: a database comprising information on whether the article has been purchased or not; an input/output interface in wireless radiofrequency communication with the self-alarming tag for transmitting a deactivation signal to the self-alarming tag for deactivation thereof upon the request of a user; a processor in communication with the database for receiving purchase information therefrom and with the input/output interface for control thereof, wherein the processor is configured to allow the input/output interface to transmit the deactivation signal to the self-alarming tag if the article linked therewith has been purchased and to prevent the input/output interface from transmitting the deactivation signal to the self-alarming tag if the article linked therewith has not been purchased, wherein the processor comprises a set of additional conditions for allowing the input/output device to transmit the deactivation signal to the self-alarming tag, selected from the group consisting of: a predetermined time lapse between the purchase time of the article and the request of a user; a predetermined time range for the purchase to occur; a predetermined location of the self-alarming tag and the article; a predetermined location of the input/output interface; a predetermined distance between the input/output interface and the self-alarming tag; an identification code entry of the user prior to the request; and any combination of the foregoing.

In an embodiment, the device further comprises a purchase interface for effectuating purchase of the article.

In an embodiment, the device comprises a handheld unit.

In an embodiment, the processor communicates with an alarm-signaling device to signal an alarm if a predetermined irregular amount of deactivation requests have been made.

In accordance with an aspect of the disclosure, there is provided a kit for retail theft prevention comprising at least one self-alarming tag for being linked to an article for signaling an alarm in the case of attempted theft of the article; a database comprising information on whether the article has been purchased or not; at least one input/output interface in communication with the self-alarming tag for transmitting a deactivation signal to the self-alarming tag for deactivation thereof upon the request of a user; a processor in communication with the database for receiving purchase information therefrom and with the input/output interface for control thereof, wherein the processor is configured to allow the input/output interface to transmit the deactivation signal to the self-alarming tag if the article linked therewith has been purchased and to prevent the input/output interface from transmitting the deactivation signal to the self-alarming tag if the article linked therewith has not been purchased.

In an embodiment of the kit, the processor comprises a set of additional conditions for allowing the input/output device to transmit the deactivation signal to the self-alarming tag, selected from the group consisting of: a predetermined time lapse between the purchase time of the article and the request of a user; a predetermined location of the self-alarming tag and the article; a predetermined location of the input/output interface; a predetermined distance between the input/output interface and the self-alarming tag; an identification code entry of the user prior to the request; and any combination of the foregoing.

In accordance with an aspect of the disclosure, there is provided a kit for retail theft prevention comprising: at least one self-alarming tag for being mounted to an article for signaling an alarm in the case of attempted theft of the article, the self-alarming tag signaling an alarm indicative of an unauthorized distance between the tag and the article; a database comprising information on whether the article has been purchased or not: at least one input/output interface In wireless radiofrequency communication with the self-alarming tag for transmitting a deactivation signal to the self-alarming tag for deactivation thereof upon the request of a user; a processor in communication with the database for receiving purchase information therefrom and with the input/output interface for control thereof, wherein the processor is configured to allow the input/output interface to transmit the deactivation signal to the self-alarming tag if the article linked therewith has been purchased and to prevent the input/output interface from transmitting the deactivation signal to the self-alarming tag if the article linked therewith has not been purchased, and wherein the processor comprises a set of additional conditions for allowing the input/output device to transmit the deactivation signal to the self-alarming tag, selected from the group consisting of: a predetermined time lapse between the purchase time of the article and the request of a user; a predetermined location of the self-alarming tag and the article; a predetermined location of the input/output interface; a predetermined distance between the input/output interface and the self-alarming tag; an identification code entry of the user prior to the request; and any combination of the foregoing.

In an embodiment, the kit further comprises a purchase interface for effectuating purchase of the article.

In an embodiment, the processor communicates with an alarm-signaling device to signal an alarm if a predetermined irregular amount of deactivation requests have been made.

In accordance with an aspect of the disclosure, there is provided a method for modulating the activation of a plurality of anti-theft self-alarming tags mounted to respective articles each self-alarming tag signaling an alarm indicative of an unauthorized distance between each tag and the respective article it is mounted to, the method comprising: remotely storing in real time information on whether the article has been purchased or not; remotely transmitting a deactivation signal to the self-alarming tag for deactivation thereof upon the request of a user, remotely allowing the transmission of the deactivation signal to the self-alarming tag if the article linked therewith has been purchased and remotely allowing the transmission of the deactivation signal to the self-alarming tag based on a set of additional conditions selected from the group consisting of: a predetermined time lapse between the purchase time of the article and the request of a user; a predetermined location of the self-alarming tag and the article; a predetermined location of the input/output interface; a predetermined distance between the input/output interface and the self-alarming tag; an identification code entry of the user prior to the request; and any combination of the foregoing; remotely preventing the input/output interface from transmitting the deactivation signal to the self-alarming tag if the article linked therewith has not been purchased.

In accordance with an aspect of the disclosure, there is provided a method for modulating the activation of a plurality of anti-theft self-alarming tags linked to respective articles, the method comprising: remotely storing in real time information on whether the article has been purchased or not; remotely transmitting a deactivation signal to the self-alarming tag for deactivation thereof upon the request of a user; remotely allowing the transmission of the deactivation signal to the self-alarming tag if the article linked therewith has been purchased; and remotely preventing the input/output interface from transmitting the deactivation signal to the self-alarming tag if the article linked therewith has not been purchased.

In an embodiment, the method further comprises allowing the transmission of the deactivation signal to the self-alarming tag based on a set of additional conditions selected from the group consisting of: a predetermined time lapse between the purchase time of the article and the request of a user; a predetermined location of the self-alarming tag and the article; a predetermined location of the input/output interface; a predetermined distance between the input/output interface and the self-alarming tag; an identification code entry of the user prior to the request; and any combination of the foregoing.

In an embodiment, there is provided an internal control system which deters employees from stealing merchandise from their own employers.

The term "package" or "packaging" also includes without limitation whatsoever to the broad definition thereof a box of any type of configuration or any other type of full or partial enclosure for housing, enclosing or otherwise mounting an item therein or thereto as is known in the art made by any type of material.

The term "article(s)" also includes package, packages, and items depending on the use of a particular device, or assembly of devices disclosed herein.

Other objects, advantages and features of the present disclosure will become more apparent upon reading of the following non-restrictive description of illustrative embodiments thereof, given by way of example only with reference to the accompanying drawings.

DETAILED DESCRIPTION OF ILLUSTRATIVE EMBODIMENTS

Generally stated and in accordance with a non-limiting illustrative embodiment, there is provided devices, kits, methods and systems for modulating the activation of an anti-theft self-alarming tag linked to an article by way of a input/output interface in communication with the self-alarming tag for transmitting a deactivation signal to the self-alarming tag for deactivation thereof upon the request of a user. A processor is in communication the input/output interface for control thereof. The processor is in communication with a database comprising information on whether the article has been purchased or not for receiving purchase information therefrom. The processor is configured to allow the input/output interface to transmit the deactivation signal to the self-alarming tag if the article linked therewith has been purchased and to prevent the input/output interface from transmitting the deactivation signal to the self-alarming tag if the article linked therewith has not been purchased With reference, to the appended Figure, non-restrictive illustrative embodiments will be herein described so as to further exemplify the disclosure only and by no means limit the scope thereof.

Figure 1:
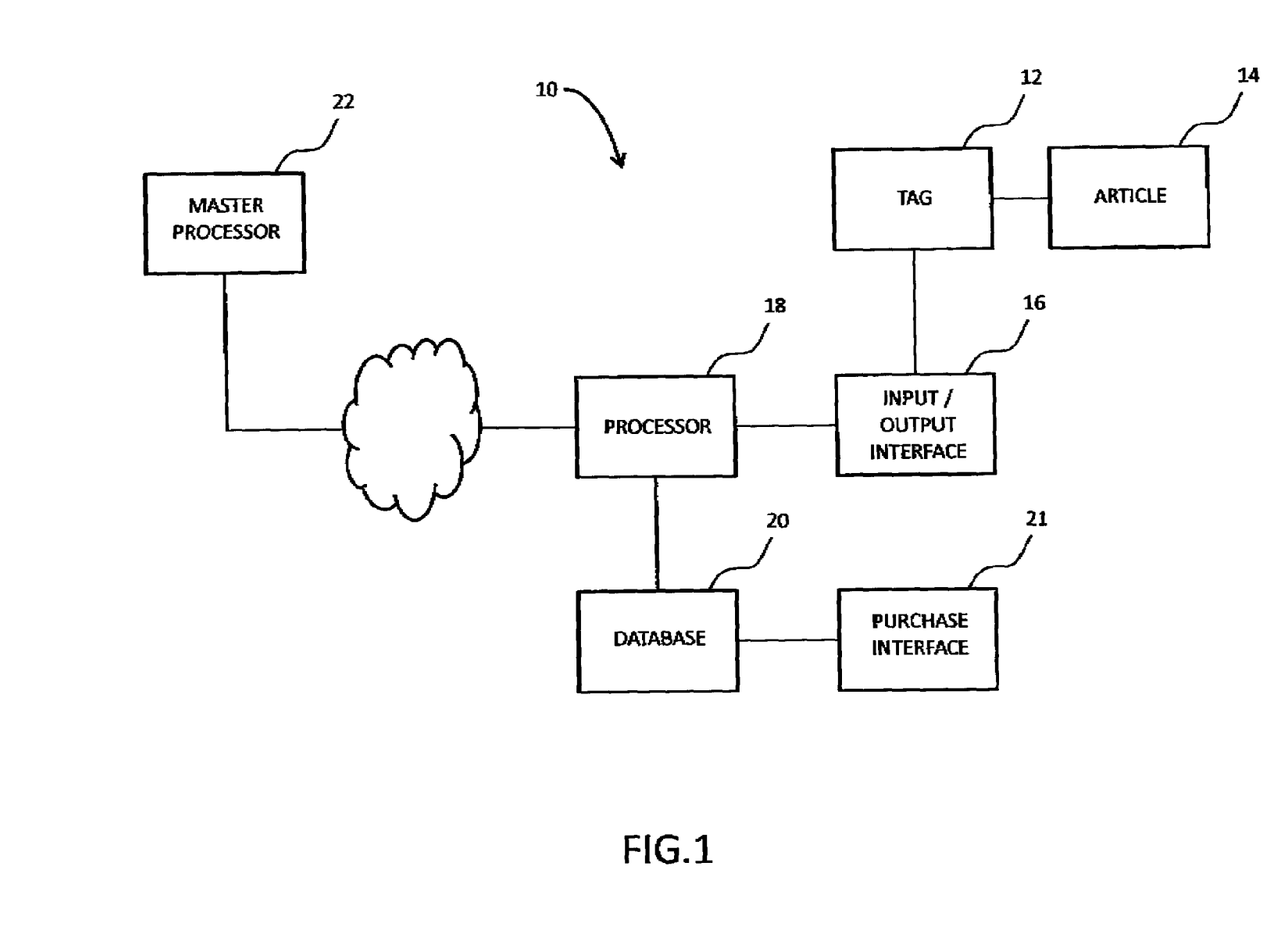
FIG. 1 is a schematic representation of a system of for modulating activation of security tags in accordance with a non-restrictive illustrative embodiment of the present disclosure.

FIG. 1 shows a system 10 in accordance with an illustrative embodiment of the present disclosure. The system 10 includes a self-alarming tag 12 (RFID, EAS tag, smart labels, intelligent bar codes etc.) in communication with an article 14 (item, product package, etc.). As such, the article 14 cannot be removed from an authorized delimited area (store, checkout area etc.) unless the tag 12 is deactivated otherwise, if the article 14 is removed from the authorized delimited area, the activated tag 12 will trigger an alarm. Moreover, the tag 12 can also trigger an alarm when it is removed prior to be being deactivated.

The tags of the present disclosure comprise the various devices discussed in PCT/CA2012/000509 and in PCT/CA2014/000124 which are incorporated herein by reference in their entirety.

An input/output interface device 16 is in communication with the tag 12 for deactivating the tag 12 subsequent to purchase so as not to trigger an alarm when the customer leaves the authorized delimited area with the purchased article 14 or when the employee at the point of sale (such as the checkout), for example, removes the tag 12 from the purchased article 14.

The interface device 16 is in communication with a processor 18. The processor 18 controls the interface device 16 in deactivating the tag 12.

It is understood herein that the term "processor" includes without limitation a processing unit, a computing device, an integrated circuit, a central processing unit, a microprocessor, and the like and comprises an associated memory with an instruction set specific to its application.

The processor 18 is configured to identify the tag 12 and verify whether or not the article 14 to which the tag 12 is linked has been purchased. The processor 18 is thus in communication with a database 20 which receives purchasing information via a purchasing or purchase interface 21 such a cash register, a checkout, a self-checkout (self-service checkout, or a semi attended customer activated terminal) or point of sale device as is known in the art.

As such, when the user requests (by way of a push button for example) the input/output interface device 16 to deactivate the tag 12, this request is communicated to the processor 18. The processor 18 verifies if the given article 14 on which the given tag 12 is linked to has been purchased (in accordance with the information in the database 20). If this pre-condition is met and the article 14 has indeed been purchased, then the processor 18 will allow the deactivation signal to be transmitted to the tag 12 thereby deactivating the tag 12. Alternatively, if the processor 18 determines that the pre-condition of the article having been purchased has not been met, then the processor 18 will prevent for the deactivation signal to be transmitted to the tag 12 and thus the tag 12 will remain active so as to signal the alarm as discussed hereinabove.

The point of sale devices include various other forms of personalized shopping devices and methods (e.g. IPay™) through smart phones or tablets (e.g. iPad™) or the like, where shoppers can purchase an item through their own personal device (i.e. the purchase interface 21).

In an embodiment, the shopper walks through the store chooses an article and merely purchases the article on site via their personal purchase interface 21. As they proceed to exit the store, the tag 12 is read by an exit security reader which comprises the input/output interface 16. Walking through this exit security reader (comprising the input/output interface 16) is in essence a request to the input/output interface device 16 to deactivate the tag 12, this request is communicated to the processor 18. Therefore, proceeding to exit the premises via the exit security reader is akin to a user actuating a deactivation command (as explained above). As before, the processor 18 verifies if the given article 14 on which the given tag 12 is linked to has been purchased (in accordance with the information in the database 20). If this pre-condition is met and the article 14 has indeed been purchased, then the processor 18 will allow the deactivation signal to be transmitted to the tag 12 thereby deactivating the tag 12 thus allowing the shopper to simply walk out of the store without any alarm being activated. If the processor 18 determines that the pre-condition of the article having been purchased has not been met, then the processor 18 will prevent for the deactivation signal to be transmitted to the tag 12 and thus the tag 12 will remain active so as to signal the alarm as the shopper walks past the reader.

In another embodiment, the shopper merely puts each article 14 in their shopping cart; the tags 12 can talk to a networked system in the store which tracks the article 14 placed in the shopping cart. For example, the tags communicate with an electronic reader connected to a network that will send information on the article 14 to the retailer and product manufacturers. The shopper has an account that is notified in real time of the purchase (namely the placement of the article 14 in the shopping cart). The account based on its payment capacity will accept or reject the purchase. Therefore, the purchase interface 21 comprises an electronic reader in the store that can track the position of the item 14. The shopper will then proceed to walk through an exit security reader as explained above.

In another embodiment, the purchase interface 21 comprises a portable scanner that is used by the shopper to scan and bag articles 14 while shopping. When the shopper has finished shopping, the scanner is brought to a self-checkout station, where the information from the scanner is downloaded. The customer pays and receives a receipt at the self-checkout station. The shopper will then proceed to walk through an exit security reader as explained above.

In an embodiment, the processor 18 is configured to determine if an irregular amount of deactivation attempts have been made. If this is the case, the processor 18 can signal a warning from the output/input interface device 16 or from another alarm unit.

In an embodiment, the processor 18 is configured to determine whether a time interval between a purchase and a deactivation command is within a regular predetermined time range. For example, if an irregular lapse of time has passed between a purchase and a deactivation request, the processor 18 may be configured to prevent the deactivation signal to be transmitted. Moreover, the processor 18 can provide for the interface device 16 to emit a warning signal (sound, light etc.) when a deactivation command is registered following a predetermined irregular time lapse from the purchase time.

In an embodiment, the processor 18 is configured to allow for a deactivation command to be emitted only in predetermined zones of the authorized delimited area. An additional security measure is to include additional monitoring devices such as image capture devices, sensors, cameras, GPS devices, RFID devices etc. at these predetermined regions. The date and time of deactivation is logged and additionally it may be recorded. Therefore, deactivation activity can be verified against the recorded event. Moreover, the processor 18 can provide for the interface device 16 to emit a warning signal (sound, light etc.) when a deactivation request is registered in an unauthorized zone.

In an embodiment, the processor 18 is configured to receive an identification code from the interface device 16. This identification code is an additional pre-condition for allowing the deactivation command to be emitted. As such, the employee must enter their identification into the interface device 16 and this information is transmitted to the processor 18. The processor 18 can be configured to determine whether the given identification code entered has been entered within an authorized predetermined date and time. As such, the code of a given employee cannot be entered outside this employees working hours preventing fraudulent code entries. An additional precondition is to provide for entering codes only in predetermined zones of the authorized delimited area. The processor 18 can thus determine if the coda is entered in the interface device 16 within these predetermined regions. An additional security measure is to include cameras, GPS devices, RFID devices etc. at these predetermined zones. The date and time of code entry is logged and additionally it may be recorded. Therefore, code entry activity can be verified against the recorded event. Moreover, the processor 18 can provide for the interface device to emit a warning signal (sound, light etc.) when entering a given code outside the authorized predetermined date and time or outside the predetermined regions.

The processor 18 can provide for activity reports regarding the foregoing and thus monitor unusual deactivation or attempted deactivation trends.

A plurality of processors 18 in respective areas (stores etc.) can be in communication with a remote master processor 22 which can monitor deactivation activity in a given geographic region in which the plurality of processors 18 are positioned.

In an embodiment, the processor 18 is configured to allow the deactivation signal to be transmitted at a predetermined distance range between the interface device 16 and the tag 12. This adds a further security condition of forcing certain proximity between the user requesting the deactivation and the article 14 on which the tag 12 is linked.

In an embodiment, the processor 18 is remote from the interface device 16 and in wireless communication therewith. In an embodiment, the processor 18 is in wireless communication with a plurality of interface devices 16.

In an embodiment, the processor 18 is configured to allow only one article 14 at a time to be deactivated by a given interface device 16. This adds an additional level of security during checkout of multiple items.

In an embodiment, the processor 18 is configured to allow the deactivation signal to be transmitted based on additional article information thus requiring an additional input device to provide the processor 18 with information such as the article weight etc. This is useful in self-checkout stations.

In an embodiment, the processor 18 is in wired communication with the interface device 18 and therefore defines a modulating device.

In an embodiment, the processor 18 is a computer.

In an embodiment, the interface device 16 is a handheld unit.

In an embodiment, the interface device 16 requires a code in order to effectuate a deactivation command.

In an embodiment the processor 18 is a micro-processor and is integral to the interface device 16.

In an embodiment, the communication between the tag 12 and the interface device 16 is by radiofrequency identification.

Figure 2:
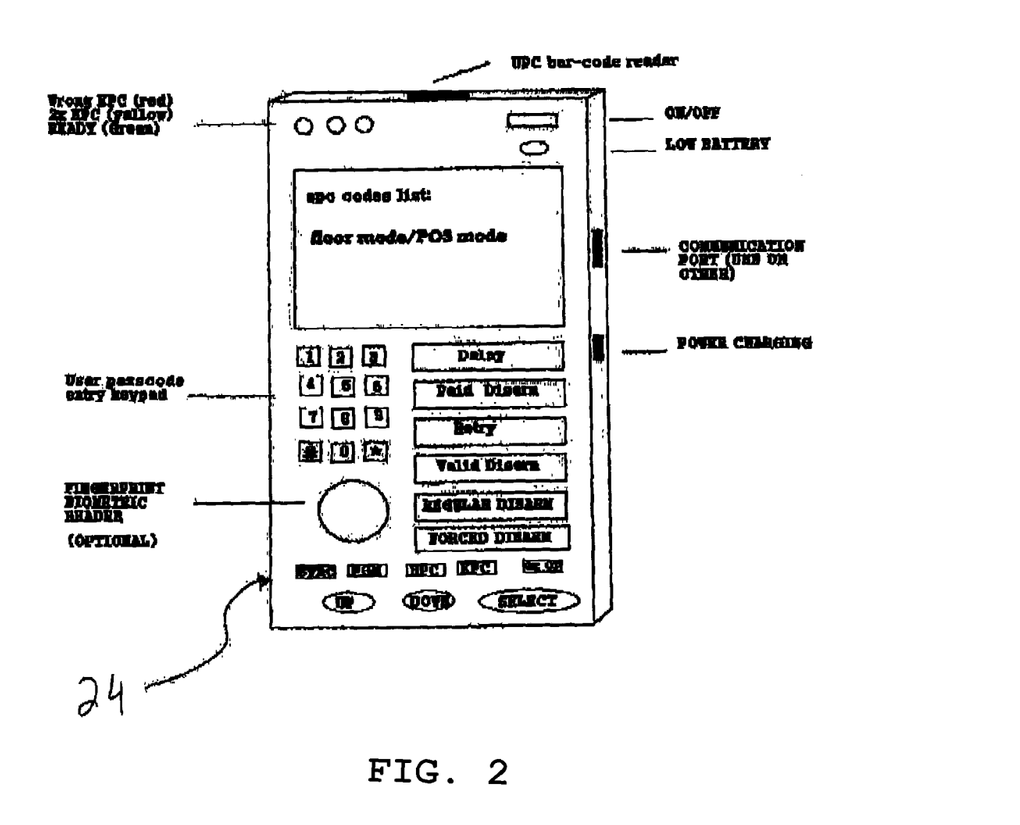
FIG. 2 is a perspective view of a handheld device for modulating activation of security tags in accordance with a non-restrictive illustrative embodiment of the present disclosure.

An example of a handheld unit 24 comprising both the micro-processor 18 and the interface device 16 is shown in FIG. 2 and providing for selectively deactivating a tag 12 for example a RFID-EPC (Electronic Product Coded) tag 12. In an embodiment, the handheld unit comprises an smartphone, an iPad, a tablet, and the like.

In another embodiment, the handheld unit 24 communicates with a remote processor 18 by way of micro-processor or without the use of an internal micro-processor. Therefore, reference to micro-processor in the description below can refer to processor mutatis mutandis.

In an embodiment, the devices of the disclosure combines the self-alarming tags 12 with RFID which comprising encoding to identify each article.

Conventional devices deactivate tags only after a valid transaction at the POS. The present disclosure provides for capturing unauthorized removal of the security tag 12 or any activity (which is linked by an RFID to a particular article 14) on the sales floor and links it to employee activity since the handheld unit 24 simultaneously identifies the user and the article 14. Therefore, the handheld unit 24 deactivates the tag 12 linked to a particular article 14 inside the package is identified as purchased in the database 20 (or any other additional validation status as described herein). If this precondition is not met, then the deactivation signal is not transmitted and tag 12 will continue to be active. As such, if anyone, including employees, tries to remove the self-alarming tag 12, an alarm will be triggered. In an embodiment, the tag 12 is a self-alarming RFID-EPC (Electronic Product Coded) tag. In an embodiment, the triggered alarm can only be deactivated by authorized personnel such as management.

In an embodiment, an alarm comprises an alert which is wirelessly and silently transmitted to receiving unit such as a pager to authorized personnel.

In an embodiment, in order for the handheld unit 24 to deactivate the tag 12, the article 14 must comprise a "paid" status at the POS correlated with an acceptable predetermined time lapse between the purchase and the deactivation request.

The tag 12 contains a unique code/address for each article 14. The handheld unit 24 verifies if the encoded information on the tag 12 comprises a "paid" status for a given status. When a "paid" status is acknowledged the handheld unit 24 indicates same to the user (by way of a light for example) and deactivation is permitted. The user thus requests deactivation by a way of push button for example, and the tag 12 can be removed without triggering an alarm within a predetermined time interval such as 1-15 sec from deactivation. Moreover, the handheld unit 24 contains information regarding the purchase time of an article and thus the deactivation signal is only transmitted within a predetermined time interval from the purchase time ensuring that deactivation is at the POS.

In the case where an employee fails to remove the self-alarming tag 12 after a deactivation request and makes a second deactivation request, the handheld unit 24 recognizes that another attempt is being made and prevents transmittal of a deactivation signal to the same tag 12. The second request can be authorized by an additional pass code entry known to authorized personnel.

The security level of the handheld unit 24 can be modulated and a low security setting can permit more than one attempt on all or specifically designated articles previously entered into its micro-processor 18 memory.

The activity log of the handheld unit 24 is kept in the micro-processor 18 memory would be kept and accessible for audit.

In an embodiment, the micro-processor 18 does not allow the deactivation signal if the handheld unit 24 reads more than one tag 12. Thereby, ensuring that the handheld unit 24 does not disarm more than one tag 12.

In an embodiment, the reading range of the handheld unit 24 is narrowed to a predetermined close proximity in order to avoid reading more than one tag 12 at the PUS for example, where the likelihood of having more than one item is high. Cashiers may also keep items at a distance from each other during checkout to avoid the handheld unit 24 from reading more than item.

In an embodiment, the handheld unit 24 can have a floor mode or a POS mode with the additional criteria mentioned herein for avoiding reading more than one tag 12 at a time.

It may be desired even on the sales floor to remove the self-alarming tag 12 without having to move other articles away from the target article. In this case the "proximity button" is enabled which reduces the read range and thus the target article will have to be scanned from a closer range in order to read the tag 12 for deactivation.

In an embodiment, the various features described herein are fully integrated into check-out scanners. The foregoing provides for a multiple step process along proximity requirements for the enhanced security described above.

In an embodiment, in order to avoid deactivation of other self-alarming tags 12 on the floor, the deactivation signal is only allowed to be transmitted within the predetermined vicinity the target tag 12, moreover the handheld unit 24 must simultaneously read identify the target tag 12. In an embodiment, a greater reading range is provided to the handheld unit 24 in order to read a tag 12 positioned inside a package. Initially, the handheld unit 24 identifies the tag. If the proper target tag 12 has been identified (EPC code etc.), the employee can deactivate the tag 12 by making a request in accordance with a predetermined protocol. During such an operation, if more than one tag 12 is read with an unpaid status and/or the wrong identification code is read with an unpaid status, the micro-processor 18 will not allow transmission of a deactivation signal. As such, the articles may need to be moved away from one another for a proper reading of the target tag 12. For such cases, the handheld unit 12, in an embodiment, may include a retry control. In an embodiment, the retry control is submitted to a protocol. In an embodiment, the protocol includes validation by authorized personnel (manager etc.). Of course, the foregoing may be undesirable in certain cases such as at the shipping/ receiving department, moreover, other security measures are present at the POS (e.g. video overlay, analytics etc.), the foregoing validation feature can be disabled by authorized personnel. As such, the authorized personnel can enter their code and request that the feature be disabled or overridden. The micro-processor 18 transmits all activity to the master processor 22 which provides for detailed activity reports.

In an embodiment, if the handheld unit 24 reads a tag 12 which already had a deactivation attempt by another user (regardless of the device used) it will not permit another attempt. Thus the handheld unit 24 registers on the EPC that there was a previous deactivation attempt. The micro-processor 18 can be programmed to allow a predetermined amount of deactivation attempts. In cases, where deactivation is no longer possible due to a previous attempt, the intervention of authorized personnel with specific code access would be required for the deactivation signal to be allowed to be transmitted.

In one embodiment, the certain articles or categories of articles may be blocked from deactivation by the microprocessor 18.

Other preconditions include to prevent multiple deactivations of the same handheld unit 24 within given time frame for a certain category of employees (e.g. floor employees) and/or restrict the number of deactivations, and/or restrict certain articles from being deactivated by a particular user.

Of course, all user activity can be stored in the microprocessor 18 and transmitted to the master processor 22.

In an embodiment, a tag 12 comprises predetermined acceptable codes which when accepted by the handheld unit 24 deactivate the tag 12 and prevent emission of an alarm signal. In an embodiment, a given tag 12 with such an acceptable code has to be cleared by the unit 24. In one embodiment, Employees can scan the articles that will receive clearance and register them in the micro-processor memory and then get approval for clearing articles from authorized personnel by having the latter enter a user code (pass-code, fingerprint biometric scanner etc.) and then select each article one by one via the unit 24 interface or the interface of another processor linked to the unit 24. The authorized personnel can scroll up and down the different EPC codes using he visual display of the interface which indicates which articles have been cleared. The authorized personnel can confirm a cleared article or remove an article erroneously cleared.

In an embodiment, a network system (e.g. master processor 22) communicates via cradle, cable or wireless to the handheld unit 24 any articles which are cleared for self-alarming tag removal.

In an embodiment, the master processor 22 provides for providing exception reports and monitoring correlations as is understood in the art.

In an embodiment, the tag 12 is encoded at the manufacture or anywhere along the supply chain before it arrives at the store and is removed at the POS.

In an embodiment, UPC (Universal Product Code) information could also be converted and encoded onto the tag 12.

In an embodiment, the handheld unit 24 could also be used to deactivate only if it recognizes a valid bar-code. Thus deactivation would only occur when a bar-code is scanned.

In an embodiment, the handheld unit 24 comprises is automatically locked at predetermined times and dates avoiding unauthorized access (such as outside store hours etc.). In an embodiment, the handheld unit 24 comprises a "die" feature in order to automatically "log off" at a certain time of the day and it will require authorized personnel for reactivation.

In an embodiment, the handheld unit 24 comprises a control interface such as a keypad, fingerprint biometric technology etc.

In an embodiment, in order to avoid false alarms, the handheld unit 24 may be provided with a delay mode that provides for temporarily deactivating the alarm for a limited amount of time.

In an embodiment, the handheld unit 24 is provided with a pre-programmed forced deactivation feature allowing a user to deactivate the alarm before or after the aforementioned delay mode stated above.

In an embodiment, the handheld unit 24 includes a port for downloading the memory (activity log etc.) via wire to another processor.

In an embodiment, the handheld unit 24 communicates with revolving wireless and encrypted codes or any other secure wireless technology as known in the art.

The alarm and/or signals discussed herein could also be sent wirelessly to a pager set, receiver device, communicated using Bluetooth or wi-fi to send email or text notifications and any other wireless transmission to signal an alert as is known in the art.

In an embodiment, the self-alarm tag comprises a memory for logging activity (last linked EPC, alarm times, de-activation and re-activation times, EPC not linked, change low battery, etc.) which would be helpful during investigations if the tag is found after being attacked by thieves or during audits.

In an embodiment, NFC emitters placed around public places provide for encoding delimited areas which include articles with the self-alarming tags 12.

In an embodiment, the deactivation signal can be selectively modified to prevent defeating the devices, kits, methods and systems herein.

The various features described herein can be combined in a variety of ways within the context of the present disclosure so as to provide still other embodiments. As such, the embodiments are not mutually exclusive. Moreover, the embodiments discussed herein need not include all of the features and elements illustrated and/or described and thus partial combinations of features can also be contemplated. Furthermore, embodiments with less features than those described can also be contemplated.

It is to be understood that the present disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation.

Hence, although the present disclosure has been provided hereinabove by way of non-restrictive illustrative embodiments thereof, it can be modified, without departing from the scope, spirit and nature thereof and of the appended claims.

What is claimed is:

1. A system for modulating the activation of a plurality of anti-theft self-alarming tags linked to respective articles, the system comprising:
   at least one database comprising information on whether a given one or more of the plurality of articles has been purchased or not;
   at least one input/output interface in communication with at least one of the plurality of self-alarming tags for transmitting a deactivation signal to the at least one of the plurality of self-alarming tag for deactivation thereof upon the request of a user;

at least one processor in communication with the database for receiving purchase information therefrom and with the input/output interface for control thereof, wherein the processor is configured to allow the input/output interface to transmit the deactivation signal to the given self-alarming tag if the article linked therewith has been purchased and to prevent the input/output interface from transmitting the deactivation signal to the given one self-alarming tag if the article linked therewith has not been purchased, wherein the at least one processor comprises a set of additional conditions for allowing the input/output device to transmit the deactivation signal to the self-alarming tag, selected from the group consisting of:
 a predetermined time lapse between the purchase time of the article and the request of a user;
 a predetermined location of the self-alarming tag and the article;
 a predetermined location of the input/output interface;
 a predetermined distance between the input/output interface and the self-alarming tag;
 an identification code entry of the user prior to the request; and
 any combination of the foregoing.

2. A system according to claim 1, wherein at least one the plurality of the tags is selected from the group consisting of an RFID tag, an RFID-EPC tag, an EAS tag, a smart label, an intelligent bar code and any combination thereof.

3. A system according to claim 1, further comprising a purchase interface for effectuating purchase of the article.

4. A system according to claim 1, further comprising a device for modulating the activation of a plurality of anti-theft self-alarming tags linked to respective articles, wherein the device comprises a element selected from the group consisting of the input/output interface, the processor, the database, the purchase interface and any combination thereof.

5. A system according to claim 4, wherein the device comprises a handheld unit.

6. A system according to claim 1, wherein the processor communicates with an alarm-signaling device to signal an alarm if a predetermined irregular amount of deactivation requests have been made.

7. A system according to claim 1, further comprising additional monitoring devices at predetermined regions within a purchasing area.

8. A system according to claim 7, wherein the additional monitoring devices are selected from the group consisting of: image capture devices, sensors, cameras, GPS devices, RFID devices and any combination thereof.

9. A system according to claim 1, further comprising a plurality of processors and a master processor in communication with the plurality of processors for receiving activity information therefrom, the master processor configured to analyze the activity information.

10. A system for modulating the activation of a plurality of anti-theft self-alarming tags mounted to respective articles, each self-alarming tag signaling an alarm indicative of an unauthorized distance between each tag and the respective article it is mounted to, the system comprising:
 at least one database comprising information on whether a given one or more of the plurality of articles has been purchased or not;
 at least one input/output interface in wireless radiofrequency communication with at least one of the plurality of self-alarming tags for transmitting a deactivation signal to the at least one of the plurality of self-alarming tag for deactivation thereof upon the request of a user;
 at least one processor in communication with the database for receiving purchase information therefrom and with the input/output interface for control thereof,
 wherein the processor is configured to allow the input/output interface to transmit the deactivation signal to the given self-alarming tag if the article linked therewith has been purchased and to prevent the input/output interface from transmitting the deactivation signal to the given one self-alarming tag if the article linked therewith has not been purchased, and
 wherein the at least one processor comprises a set of additional conditions for allowing the input/output device to transmit the deactivation signal to the self-alarming tag, selected from the group consisting of:
  a predetermined time lapse between the purchase time of the article and the request of a user;
  a predetermined location of the self-alarming tag and the article;
  a predetermined location of the input/output interface;
  a predetermined distance between the input/output interface and the self-alarming tag;
  an identification code entry of the user prior to the request; and
  any combination of the foregoing.

11. A system according to claim 10, wherein at least one the plurality of the tags is selected from the group consisting of an RFID tag, an RFID-EPC tag, an EAS tag, a smart label, an intelligent bar code and any combination thereof.

12. A system according to claim 10, further comprising a purchase interface for effectuating purchase of the article.

13. A system according to claim 10, further comprising a device for modulating the activation of a plurality of anti-theft self-alarming tags linked to respective articles, wherein the device comprises a element selected from the group consisting of the input/output interface, the processor, the database, the purchase interface and any combination thereof.

14. A system according to claim 13, wherein the device comprises a handheld unit.

15. A system according to claim 10, wherein the processor communicates with an alarm-signaling device to signal an alarm if a predetermined irregular amount of deactivation requests have been made.

16. A system according to claim 10, further comprising additional monitoring devices at predetermined regions within a purchasing area.

17. A system according to claim 16, wherein the additional monitoring devices are selected from the group consisting of: image capture devices, sensors, cameras, GPS devices, RFID devices and any combination thereof.

18. A system according to claim 10, further comprising a plurality of processors and a master processor in communication with the plurality of processors for receiving activity information therefrom, the master processor configured to analyze the activity information.

19. A method for modulating the activation of a plurality of anti-theft self-alarming tags linked to respective articles, the method comprising:
 remotely storing in real time information on whether the article has been purchased or not;

remotely transmitting a deactivation signal to the self-alarming tag for deactivation thereof upon the request of a user;
remotely allowing the transmission of the deactivation signal to the self-alarm ing tag if the article linked therewith has been purchased; and
remotely preventing the input/output interface from transmitting the deactivation signal to the self-alarming tag if the article linked therewith has not been purchased,
allowing the transmission of the deactivation signal to the self-alarming tag based on a set of additional conditions selected from the group consisting of:
  a predetermined time lapse between the purchase time of the article and the request of a user;
  a predetermined location of the self-alarming tag and the article;
  a predetermined location of the input/output interface;
  a predetermined distance between the input/output interface and the self-alarming tag;
  an identification code entry of the user prior to the request; and
  any combination of the foregoing.

20. A method for modulating the activation of a plurality of anti-theft self-alarming tags mounted to respective articles, each self-alarming tag signaling an alarm indicative of an unauthorized distance between each tag and the respective article it is mounted to, the method comprising:

remotely storing in real time information on whether the article has been purchased or not;
remotely transmitting a deactivation signal to the self-alarming tag for deactivation thereof upon the request of a user;
remotely allowing the transmission of the deactivation signal to the self-alarm ing tag if the article linked therewith has been purchased and remotely allowing the transmission of the deactivation signal to the self-alarming tag based on a set of additional conditions selected from the group consisting of:
  a predetermined time lapse between the purchase time of the article and the request of a user;
  a predetermined location of the self-alarming tag and the article;
  a predetermined location of the input/output interface;
  a predetermined distance between the input/output interface and the self-alarming tag;
  an identification code entry of the user prior to the request; and
  any combination of the foregoing;
remotely preventing the input/output interface from transmitting the deactivation signal to the self-alarming tag if the article linked therewith has not been purchased.

* * * * *